United States Patent [19]

Inoue

[11] Patent Number: 5,047,865
[45] Date of Patent: Sep. 10, 1991

[54] SYSTEM FOR TRANSMITTING A DIGITAL VIDEO SIGNAL

[75] Inventor: Takao Inoue, Kanagawa, Japan

[73] Assignee: Sony Corporation, Tokyo, Japan

[21] Appl. No.: 283,844

[22] Filed: Dec. 13, 1988

[30] Foreign Application Priority Data

Dec. 17, 1987 [JP] Japan .................................. 62-319921

[51] Int. Cl.⁵ .............................................. H04N 9/80
[52] U.S. Cl. ...................................... 358/310; 358/13
[58] Field of Search ................... 358/12, 13, 310, 328, 358/314, 327; 360/22, 23, 32

[56] References Cited

U.S. PATENT DOCUMENTS

| 4,429,334 | 1/1984 | Hashimoto et al. | 358/310 |
| 4,531,153 | 7/1985 | Watanabe | 358/13 |
| 4,761,690 | 8/1988 | Yamanishi et al. | 358/310 |
| 4,805,034 | 2/1989 | Kitamura et al. | 358/310 |
| 4,839,744 | 6/1989 | Sasaki et al. | 358/327 |
| 4,916,548 | 4/1990 | Morioka et al. | 358/328 |

Primary Examiner—Donald McElheny, Jr.
Attorney, Agent, or Firm—Alvin Sinderbrand; William S. Frommer

[57] ABSTRACT

In the transmission of digital video data signals, for example, in a digital video tape recorder, a luminance signal and first and second chrominance signals, such as R-Y and B-Y, are individually sampled to provide respective digital luminance data signals and first and second digital chrominance data signals for forming a high-definition video picture which is spatially divided into N horizontally contiguous segments, each of the divided segments is time-expanded by N-times, the digital luminance data signals and the first and second digital chrominance data signals of each of the time-expanded picture segments are divided into respective sets thereof which each consist of two successive data signals, and the sets of digital luminance and first and second digital chrominance data signals for each of the segments are distributed into a plurality of transmission channels in such a manner that each set of digital luminance data signals is interleaved between sets of the first and second digital chrominance data signals, respectively, in each of the transmission channels. Further, one of the two successive data signals in each of the sets of digital luminance data signals and of first and second digital chrominance data signals is inverted for obtaining the complement of the one of the two successive data signals in each set which has been inverted, thereby substantially minimizing any DC or low-frequency component in each of the transmission channels.

7 Claims, 15 Drawing Sheets

FIG. 4

| OUTPUT \ CONT. | 0 | 1 | 2 | 3 | 4 | 5 | 6 | 7 |
|---|---|---|---|---|---|---|---|---|
| O8 | I8 | I7 | I6 | I5 | I4 | I3 | I2 | I1 |
| O7 | I7 | I6 | I5 | I4 | I3 | I2 | I1 | I8 |
| O6 | I6 | I5 | I4 | I3 | I2 | I1 | I8 | I7 |
| O5 | I5 | I4 | I3 | I2 | I1 | I8 | I7 | I6 |
| O4 | I4 | I3 | I2 | I1 | I8 | I7 | I6 | I5 |
| O3 | I3 | I2 | I1 | I8 | I7 | I6 | I5 | I4 |
| O2 | I2 | I1 | I8 | I7 | I6 | I5 | I4 | I3 |
| O1 | I1 | I8 | I7 | I6 | I5 | I4 | I3 | I2 |

3-bit control data

FIG. 5

|  |  |  |  |  |  |  |  |  |  |  |  |  |  |  | BARREL SHIFTER INPUT |
|---|---|---|---|---|---|---|---|---|---|---|---|---|---|---|---|
| Ya1, Ya2, Ya3, Ya4, Ya5, Ya6, Ya7, Ya8, Ya9, Ya10, Ya11, Ya12, Ya13, Ya14, Ya15, | —I1 |
| Ba1, Ba3, Ba5, Ba7, Ra1, Ra3, Ra5, Ra7, Ba9, Ba11, Ba13, Ba15, | —I5 |
| Yb1, Yb2, Yb3, Yb4, Yb5, Yb6, Yb7, Yb8, Yb9, Yb10, Yb11, Yb12, Yb13, Yb14, Yb15, | —I2 |
| Bb1, Bb3, Bb5, Bb7, Rb1, Rb3, Rb5, Rb7, Bb9, Bb11, Bb13, Bb15, | —I6 |
| Yc1, Yc2, Yc3, Yc4, Yc5, Yc6, Yc7, Yc8, Yc9, Yc10, Yc11, Yc12, Yc13, Yc14, Yc15, | —I3 |
| Bc1, Bc3, Bc5, Bc7, Rc1, Rc3, Rc5, Rc7, Bc9, Bc11, Bc13, Bc15, | —I7 |
| Yd1, Yd2, Yd3, Yd4, Yd5, Yd6, Yd7, Yd8, Yd9, Yd10, Yd11, Yd12, Yd13, Yd14, Yd15, | —I4 |
| Bd1, Bd3, Bd5, Bd7, Rd1, Rd3, Rd5, Rd7, Bd9, Bd11, Bd13, Bd15, | —I8 |

FIG. 6A

OUTPUT OF BARREL SHIFTER

| 3-BIT CONTROL DATA | 0 | 0 | 0 | 1 | 2 | 2 | 3 | 3 | 4 | 4 | 5 | 5 | 6 | 6 |
|---|---|---|---|---|---|---|---|---|---|---|---|---|---|---|
| 01 | Ya 1, | Ya 2, | Ba 1, | Ba 3, | Yb 5, | Yb 6, | Rb 1, | Rb 3, | Yc 9, | Yc 10, | Bc 9, | Bc 11, | Yd 13, | Yd 14, . |
| 02 | | | Yb 3, | Yb 4, | Bb 5, | Bb 7, | Yc 7, | Yc 8, | Rc 5, | Rc 7, | Yd 11, | Yd 12, | Bd 13, | Bd 15, |
| 03 | Yb 1, | Yb 2, | Bb 1, | Bb 3, | Yc 5, | Yc 6, | Rc 1, | Rc 3, | Yd 9, | Yd 10, | Bd 9, | Bd 11, | Ya 13, | Ya 14, . |
| 04 | | | Yc 3, | Yc 4, | Bc 5, | Bc 7, | Yd 7, | Yd 8, | Rd 5, | Rd 7, | Ya 11, | Ya 12, | Ba 13, | Ba 15, |
| 05 | Yc 1, | Yc 2, | Bc 1, | Bc 3, | Yd 5, | Yd 6, | Rd 1, | Rd 3, | Ya 9, | Ya 10, | Ba 9, | Ba 11, | Yb 13, | Yb 14, . |
| 06 | | | Yd 3, | Yd 4, | Bd 5, | Bd 7, | Ya 7, | Ya 8, | Ra 5, | Ra 7, | Yb 11, | Yb 12, | Bb 13, | Bb 15, |
| 07 | Yd 1, | Yd 2, | Bd 1, | Bd 3, | Ya 5, | Ya 6, | Ra 1, | Ra 3, | Yb 9, | Yb 10, | Bb 9, | Bb 11, | Yc 13, | Yc 14, . |
| 08 | | | Ya 3, | Ya 4, | Ba 5, | Ba 7, | Yb 7, | Yb 8, | Rb 5, | Rb 7, | Yc 11, | Yc 12, | Bc 13, | Bc 15, |

FIG.6B

OUTPUT OF DELAY CIRCUIT

| 3-BIT CONTROL DATA TO SHIFTER | 0 | 0 | 1 | 2 | 2 | 3 | 3 | 4 | 4 | 5 | 5 | 6 | 6 |
|---|---|---|---|---|---|---|---|---|---|---|---|---|---|
| D1 | Ya 1, | Ya 2, | Ba 1, | Ba 3, | Yb 5, | Yb 6, | Rb 1, | Rb 3, | Yc 9, | Yc 10, | Bc 9, | Bc 11, | Yd 13, Yd 14, . |
| D2 | Yb 3, | Yb 4, | Bb 5, | Bb 7, | Yc 7, | Yc 8, | Rc 5, | Rc 7, | Yd 11, | Yd 12, | Bd 13, | Bd 15, . | |
| D3 | Yb 1, | Yb 2, | Bb 1, | Bb 3, | Yc 5, | Yc 6, | Rc 1, | Rc 3, | Yd 9, | Yd 10, | Bd 9, | Bd 11, | Ya 13, Ya 14, . |
| D4 | Yc 3, | Yc 4, | Bc 5, | Bc 7, | Yd 7, | Yd 8, | Rd 5, | Rd 7, | Ya 11, | Ya 12, | Ba 13, | Ba 15, . | |
| D5 | Yc 1, | Yc 2, | Bc 1, | Bc 3, | Yd 5, | Yd 6, | Rd 1, | Rd 3, | Ya 9, | Ya 10, | Ba 9, | Ba 11, | Yb 13, Yb 14, . |
| D6 | Yd 3, | Yd 4, | Bd 5, | Bd 7, | Ya 7, | Ya 8, | Ra 5, | Ra 7, | Yb 11, | Yb 12, | Bb 13, | Bb 15, . | |
| D7 | Yd 1, | Yd 2, | Bd 1, | Bd 3, | Ya 5, | Ya 6, | Ra 1, | Ra 3, | Yb 9, | Yb 10, | Bb 9, | Bb 11, | Yc 13, Yc 14, . |
| D8 | Ya 3, | Ya 4, | Ba 5, | Ba 7, | Yb 7, | Yb 8, | Rb 5, | Rb 7, | Yc 11, | Yc 12, | Bc 13, | Bc 15, . | |

FIG. 8

| | | | | | | | | | | | | | | | | |
|---|---|---|---|---|---|---|---|---|---|---|---|---|---|---|---|---|
| DATA 1 | YA3 | YA4 | BA5 | BA7 | YB7 | YB8 | RB5 | RB7 | YC11 | YC12 | BC13 | BC15 | YD15 | YD16 | . | . |
| DATA 2 | YA1 | YA2 | BA1 | BA3 | YB5 | YB6 | RB1 | RB3 | YC9 | YC10 | BC9 | BC11 | YD13 | YD14 | . | . |
| DATA 3 | YB3 | YB4 | BB5 | BB7 | YC7 | YC8 | RC5 | RC7 | YD11 | YD12 | BD13 | BD15 | YA15 | YA16 | . | . |
| DATA 4 | YB1 | YB2 | BB1 | BB3 | YC5 | YC6 | RC1 | RC3 | YD9 | YD10 | BD9 | BD11 | YA13 | YA14 | . | . |
| DATA 5 | YC3 | YC4 | BC5 | BC7 | YD7 | YD8 | RD5 | RD7 | YA11 | YA12 | BA13 | BA15 | YB15 | YB16 | . | . |
| DATA 6 | YC1 | YC2 | BC1 | BC3 | YD5 | YD6 | RD1 | RD3 | YA9 | YA10 | BA9 | BA11 | YB13 | YB14 | . | . |
| DATA 7 | YD3 | YD4 | BD5 | BD7 | YA7 | YA8 | RA5 | RA7 | YB11 | YB12 | BB13 | BB15 | YC15 | YC16 | . | . |
| DATA 8 | YD1 | YD2 | BD1 | BD3 | YA5 | YA6 | RA1 | RA3 | YB9 | YB10 | BB9 | BB11 | YC13 | YC14 | . | . |

FIG.9

|     | LINE 1 | LINE 2 | LINE 3 | LINE 4 | LINE 5 | LINE 6 | LINE 7 | LINE 8 | . . . |
|-----|--------|--------|--------|--------|--------|--------|--------|--------|-------|
| CH1 | DATA 1 | DATA 4 | DATA 7 | DATA 2 | DATA 5 | DATA 8 | DATA 3 | DATA 6 | . |
| CH2 | DATA 2 | DATA 5 | DATA 8 | DATA 3 | DATA 6 | DATA 1 | DATA 4 | DATA 7 | . |
| CH3 | DATA 3 | DATA 6 | DATA 1 | DATA 4 | DATA 7 | DATA 2 | DATA 5 | DATA 8 | . |
| CH4 | DATA 4 | DATA 7 | DATA 2 | DATA 5 | DATA 8 | DATA 3 | DATA 6 | DATA 1 | . |
| CH5 | DATA 5 | DATA 8 | DATA 3 | DATA 6 | DATA 1 | DATA 4 | DATA 7 | DATA 2 | . |
| CH6 | DATA 6 | DATA 1 | DATA 4 | DATA 7 | DATA 2 | DATA 5 | DATA 8 | DATA 3 | . |
| CH7 | DATA 7 | DATA 2 | DATA 5 | DATA 8 | DATA 3 | DATA 6 | DATA 1 | DATA 4 | . |
| CH8 | DATA 8 | DATA 3 | DATA 6 | DATA 1 | DATA 4 | DATA 7 | DATA 2 | DATA 5 | . |

FIG. 10

| | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|
| LINE 1 | CH2 | CH2 | CH1 | CH1 | CH8 | CH8 | CH7 | CH7 | CH6 | CH6 | CH5 | CH5 | CH4 | CH4 | CH3 | . |
| LINE 2 | CH7 | CH7 | CH6 | CH6 | CH5 | CH5 | CH4 | CH4 | CH3 | CH3 | CH2 | CH2 | CH1 | CH1 | CH8 | . |
| LINE 3 | CH4 | CH4 | CH3 | CH3 | CH2 | CH2 | CH1 | CH1 | CH8 | CH8 | CH7 | CH7 | CH6 | CH6 | CH5 | . |
| LINE 4 | CH1 | CH1 | CH8 | CH8 | CH7 | CH7 | CH6 | CH6 | CH5 | CH5 | CH4 | CH4 | CH3 | CH3 | CH2 | . |
| LINE 5 | CH6 | CH6 | CH5 | CH5 | CH4 | CH4 | CH3 | CH3 | CH2 | CH2 | CH1 | CH1 | CH8 | CH8 | CH7 | . |
| LINE 6 | CH3 | CH3 | CH2 | CH2 | CH1 | CH1 | CH8 | CH8 | CH7 | CH7 | CH6 | CH6 | CH5 | CH5 | CH4 | . |
| LINE 7 | CH8 | CH8 | CH7 | CH7 | CH6 | CH6 | CH5 | CH5 | CH4 | CH4 | CH3 | CH3 | CH2 | CH2 | CH1 | . |
| LINE 8 | CH5 | CH5 | CH4 | CH4 | CH3 | CH3 | CH2 | CH2 | CH1 | CH1 | CH8 | CH8 | CH7 | CH7 | CH6 | . |
| LINE 9 | CH2 | CH2 | CH1 | CH1 | CH8 | CH8 | CH7 | CH7 | CH6 | CH6 | CH5 | CH5 | CH4 | CH4 | CH3 | . |
| | . | . | . | . | . | . | . | . | . | . | . | . | . | . | . | . |

FIG.13A

| H\L | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | FF | 7F | BF | DF | EF | F7 | FB | FD | FE | FC | FA | F6 | EE | DE | BE | 7E |
| 1 | 7D | BD | DD | ED | F5 | F9 | F3 | EB | DB | BB | 7B | 77 | B7 | D7 | E7 | CF |
| 2 | AF | 6F | 5F | 9F | 3F | 7C | BC | DC | EC | F4 | F8 | F2 | EA | DA | BA | 7A |
| 3 | 76 | B6 | D6 | E6 | CE | AE | 6E | 5E | 9E | 3E | 79 | B9 | D9 | E9 | F1 | E5 |
| 4 | D5 | B5 | 75 | 6D | AD | CD | 9D | 5D | 3D | 73 | B3 | D3 | E3 | CB | AB | 6B |
| 5 | 5B | 9B | 3B | 67 | A7 | C7 | 97 | 57 | 37 | 2F | 8F | 4F | 1F | 3C | 5C | 6C |
| 6 | 74 | 78 | B8 | B4 | AC | 9C | D8 | D4 | CC | E8 | E4 | F0 | E2 | D2 | B2 | 72 |
| 7 | 6A | AA | CA | 9A | 5A | 3A | 36 | 56 | 66 | A6 | 96 | C6 | 8E | 4E | 2E | 1E |
| 8 | E1 | D1 | B1 | 71 | 39 | 69 | 59 | 99 | A9 | C9 | C5 | A5 | 65 | 35 | 55 | 95 |
| 9 | 8D | 4D | 2D | 1D | 0F | 1B | 17 | 33 | 2B | 27 | 63 | 53 | 4B | 47 | 87 | 8B |
| A | 93 | A3 | C3 | E0 | B0 | 70 | D0 | C8 | A8 | 68 | 38 | 58 | 98 | C4 | 64 | A4 |
| B | 94 | 54 | 34 | 1C | 2C | 4C | 8C | C2 | A2 | 62 | 32 | 52 | 92 | 8A | 4A | 2A |
| C | 1A | 0E | 16 | 26 | 46 | 86 | C1 | 61 | A1 | 91 | 51 | 31 | 19 | 29 | 49 | 89 |
| D | 85 | 45 | 25 | 15 | 0D | 07 | 0B | 13 | 23 | 43 | 83 | C0 | 60 | A0 | 90 | 50 |
| E | 30 | 18 | 28 | 48 | 88 | 84 | 44 | 24 | 14 | 0C | 06 | 0A | 12 | 22 | 42 | 82 |
| F | 81 | 41 | 21 | 11 | 09 | 05 | 03 | 01 | 02 | 04 | 08 | 10 | 20 | 40 | 80 | 00 |

FIG.13B

| H\L | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 00 | 80 | 40 | 20 | 10 | 08 | 04 | 02 | 01 | 03 | 05 | 09 | 11 | 21 | 41 | 81 |
| 1 | 82 | 42 | 22 | 12 | 0A | 06 | 0C | 14 | 24 | 44 | 84 | 88 | 48 | 28 | 18 | 30 |
| 2 | 50 | 90 | A0 | 60 | C0 | 83 | 43 | 23 | 13 | 0B | 07 | 0D | 15 | 25 | 45 | 85 |
| 3 | 89 | 49 | 29 | 19 | 31 | 51 | 91 | A1 | 61 | C1 | 86 | 46 | 26 | 16 | 0E | 1A |
| 4 | 2A | 4A | 8A | 92 | 52 | 32 | 62 | A2 | C2 | 8C | 4C | 2C | 1C | 34 | 54 | 94 |
| 5 | A4 | 64 | C4 | 98 | 58 | 38 | 68 | A8 | C8 | D0 | 70 | B0 | E0 | C3 | A3 | 93 |
| 6 | 8B | 87 | 47 | 4B | 53 | 63 | 27 | 2B | 33 | 17 | 1B | 0F | 1D | 2D | 4D | 8D |
| 7 | 95 | 55 | 35 | 65 | A5 | C5 | C9 | A9 | 99 | 59 | 69 | 39 | 71 | B1 | D1 | E1 |
| 8 | 1E | 2E | 4E | 8E | C6 | 96 | A6 | 66 | 56 | 36 | 3A | 5A | 9A | CA | AA | 6A |
| 9 | 72 | B2 | D2 | E2 | F0 | E4 | E8 | CC | D4 | D8 | 9C | AC | B4 | B8 | 78 | 74 |
| A | 6C | 5C | 3C | 1F | 4F | 8F | 2F | 37 | 57 | 97 | C7 | A7 | 67 | 3B | 9B | 5B |
| B | 6B | AB | CB | E3 | D3 | B3 | 73 | 3D | 5D | 9D | CD | AD | 6D | 75 | B5 | D5 |
| C | E5 | F1 | E9 | D9 | B9 | 79 | 3E | 9E | 5E | 6E | AE | CE | E6 | D6 | B6 | 76 |
| D | 7A | BA | DA | EA | F2 | F8 | F4 | EC | DC | BC | 7C | 3F | 9F | 5F | 6F | AF |
| E | CF | E7 | D7 | B7 | 77 | 7B | BB | DB | EB | F3 | F9 | F5 | ED | DD | BD | 7D |
| F | 7E | BE | DE | EE | F6 | FA | FC | FE | FD | FB | F7 | EF | DF | BF | 7F | FF |

FIG.14A

| $Y_{A3}$ | $Y_{A4}$ | $B_{A5}$ | $B_{A7}$ | $Y_{B7}$ | $Y_{B8}$ |
|---|---|---|---|---|---|
| 00100001 | 00100010 | 10000000 | 10000001 | 10101011 | 10100111 |

FIG.14B 10010000 10100000 00011110 00101110 10100111 00110111 data 1 : data 0 = 4 : 12    data 1 : data 0 = 8 : 8    data 1 : data 0 = 10 : 6

FIG.14C 10010000 01011111 00011110 11010001 10100111 11001000 data 1 : data 0 = 8 : 8    data 1 : data 0 = 8 : 8    data 1 : data 0 = 8 : 8

SYSTEM FOR TRANSMITTING A DIGITAL VIDEO SIGNAL

BACKGROUND OF THE INVENTION

1. Field of the Invention

The present invention generally relates to the transmission of digital video data signals and more particularly, is applicable to data transmission in a digital video tape recorder (D-VTR) or the like which digitally records and reproduces high definition television (HDTV) video signals.

2. Description of the Prior Art

High definition television (HDTV) techniques are known for enhancing the resolution of the video image by widening the transmission band relative to that of the standard NTSC (National Television System Committee) or similar system and thereby achieving improved image quality. Telecasting based on such HDTV techniques is currently under study along with development of digital video tape recorders (D-VTR) capable of recording and reproducing HDTV video signals in a digitized form.

In a D-VTR which digitally records and reproduces HDTV video signals having a transmission band far wider than that of the standard NTSC video signals, a great amount of video data has to be processed at a high speed, and it is difficult, with existing devices and circuit technology, to provide a circuit arrangement that is adequate for directly processing such video signals. Therefore, it has been proposed heretofore to adopt a data processing method in which the processing speed is reduced by distributing the video data into number of channels for performing parallel operations thereon. For example, in a publication entitled "An Experimental HDTV Digital VTR With A Bit Rate of 1.188 Gbps", authored by persons having an obligation to assign to the assignee of the present application and appearing in "IEEE Transactions on Broadcasting" December, 1987, Vol. BC-33, No. 4, at pages 203-209, and also in U.S. patent application Ser. No. 06/925,167, filed Oct. 31, 1986, and which has been replaced by Continuation application Ser. No. 07/213,442, filed June 28, 1988, and each having a common assignee herewith, a scheme for effecting parallel data transmission is shown to involve division of the HDTV picture, at vertically extending lines of division, into N horizontally contiguous segments of the picture, whereupon the horizontal time axis of each segment is expanded, as in a memory, so as to reduce the signal processing speed for each picture segment. By using such a picture division method, the correlation between picture elements (pixels) can be fully utilized, that is, a digital filter can be provided for each divided picture so as to permit error concealment in the event of errors lying outside the error correcting ability of circuits provided therefor. More specifically, in the signal processing system being here described, the luminance signal Y and two chrominance signals R-Y and B-Y are individually sampled to provide a 4:2:2 signal format, that is, every other R-Y and B-Y signal output is dropped or the chrominance signals are sub-sampled at a lower sampling frequency than the luminance signal, whereupon the Y and remaining R-Y and B-Y signals for each segment are multiplexed, coded for error corrections and then converted to serial form for recording. In such case, most of the signal processing takes place in an 8-channel format.

In a video tape recorder (VTR), it is generally impossible to record or reproduce DC or low frequency components by means of the magnetic head used for recording and reproducing and, when such head is rotary and electrically coupled to the corresponding recording and reproducing circuits via a rotary transformer, difficulties are also encountered in transmitting the low frequency components to and from the rotary head. Furthermore, since the high frequency characteristic is deteriorated by the spacing loss, head gap loss and so forth in a magnetic recording operation, the recording/reproducing circuit of the VTR has a band-pass type frequency characteristic.

Therefore, in existing D-VTRs designed to perform digital signal recording and reproducing operations, various recording-modulation encoding methods are relied upon for conversion of the digital signals into a form substantially suited for the characteristic of the magnetic recording circuit. In accordance with one such recording-modulation encoding method, m-bit data representing one sampled or picture element (pixel) is converted into n-bit recording data, and a series of such recording data are converted by a non-return to zero (NRZ) or similar mode for recording in that mode. One of such recording-modulation encoding methods employs an 8-10 conversion mode which converts 8-bit data into 10-bit data having a satisfactory code balance for minimizing the DC component of the recorded signals. However, such 8-10 conversion undesirably increases the bits of data to be recorded, that is redundant bits have to be recorded. In order to avoid that disadvantage, an 8-8 conversion mode has been employed which rearranges the 8-bit video data without increasing the bit number thereof by utilizing the close correlationship between adjacent samples of the video signals. Although low-frequency components of the recording signals are reduced without increasing the bits of recorded data, the 8-8 conversion mode is limited in its ability to eliminate the low-frequency components of the recording signals.

Furthermore, in the existing recording/reproducing circuitry or unit in a D-VTR, an error correction code of a product code pattern is added to the digital data to be transmitted, with the intention that any data error, such as is caused by data dropout or the like, is detected and corrected or concealed at the receiving or reproducing side.

In the earlier described known D-VTR in which each image frame composed of HDTV video signals is divided into horizontally contiguous N segments to reduce the video data processing speed to 1/N, the video data of the divided frame segments are distributed into respective channels for parallel processing. In other words, the video data of each of the frame segments is distributed to a corresponding individual channel. Consequently, if any fault or increase of the error rate occurs in one channel, it becomes necessary to frequently execute error correction of the reproduced data in a manner consistent with the increase of the error rate in such channel. Moreover, if the video data of a channel is not reproducible at all, error correction becomes impossible and eventually the divided frame segment corresponding to that channel cannot be reproduced.

Further, it has been proposed, for example, as disclosed in an article entitled "Study of Multi-channel Distribution for High Definition Digital VTR" by Shinichi Mayazaki, Yoshizumi Etoh and Masuo Umemoto, appearing at pages 229-230, of the 1985-

Proceedings of the Institute of Television Engineers of Japan, to adopt run length limitation 8-8 conversion and to use two pixels as the unit of distribution of the luminance and chrominance signals which are sequentially circulated in each of a number of channels. The channel receiving the signals is shifted from one to another at every horizontal period so that the data distributed into any one of the channels does not correspond to vertically aligned pixels of the reproduced picture. The foregoing has the advantage of permitting the use of vertically adjacent data for concealment of continuous errors in a channel due to drop out or the like. However, the described multi-channel distribution for a high definition digital VTR, does not substantially eliminate low frequency components of the recording signals by its use of the run length limitation 8-8 conversion. Further, since the high speed digital video data signals are not spatially divided into a number of horizontally contiguous segments of the video picture, the described multi-channel distribution does not adequately reduce the data bit rate for processing in each channel.

OBJECTS AND SUMMARY OF THE INVENTION

Accordingly, it is an object of this invention to provide improved transmission of digital video data signals which is particularly suited for use in digitally recording and reproducing high-definition television video signals, and which avoids the above mentioned disadvantages and problems associated with the prior art.

More specifically, it is an object of this invention to provide improved transmission of digital video data signals which are distributed among a plurality of channels for parallel processing at relatively low data rates, and wherein the data distribution makes possible proper error correction for obtaining a satisfactory image even when a fault or increased error rate occurs in one of the channels.

Another object of the invention is to provide improved transmission of high speed digital video data signals, for example, corresponding to a high-definition video picture, in which the digital video data signals are spatially divided into a plurality of horizontally contiguous segments which are each time-expanded correspondingly, and in which the data signals are further divided for distribution among a number of transmission channels, with such distribution being effected so that errors occurring in a channel are dispersed throughout the entire video picture or image frame for ensuring that any deterioration of image quality, as a result of a fault or increased error rate is not concentrated in any one of the segments of the video picture.

It is a further object of this invention to substantially reduce the low frequency components of the transmitted digital video signals, for example, so as to facilitate the accurate magnetic tape recording thereof, without adding redundant bits thereto, as in the previously employed 8–10 conversion.

In accordance with an aspect of this invention, in transmitting digital video data signals comprised of digital luminance data signals and first and second digital chrominance data signals, such as, R-Y and B-Y signals; the digital luminance data signals are divided into sets thereof each consisting of two successive digital luminance data signals, and the first and second digital chrominance data signals are similarly divided into respective sets thereof each consisting of two successive first or second digital chrominance data signals, respectively, whereupon the sets of digital luminance data signals and of first and second digital chrominance data signals are distributed into a plurality of transmission channels in such a manner that each set of digital luminance data signals is interleaved between sets of the first and second digital chrominance data signals, respectively, with one of the two successive data signals in each of the sets of digital luminance data signals and of first and second digital chrominance data signals being inverted for obtaining the complement of the one of the two successive data signals in each set which has been inverted and thereby substantially minimizing any low frequency or DC component in each of the transmission channels.

In accordance with another aspect of this invention, in transmitting high speed digital video data signals comprised of digital luminance data signals and first and second digital chrominance data signals for forming a high-definition video picture; the high speed digital video data signals are spatially divided into a number of horizontally contiguous segments of the corresponding video picture which are then each correspondingly time-expanded, the digital luminance data signals and the first and second digital chrominance data signals of each of the segments are divided into respective sets thereof each consisting of two successive digital luminance data signals, or two successive first or second digital chrominance data signals, respectively, and then the sets of digital luminance data signals and of first and second digital chrominance data signals for each of the segments are distributed into a plurality of transmission channels in such a manner that each set of digital luminance data signals is interleaved between sets of the first and second digital chrominance data signals, respectively, in each of the transmission channels.

In the last described aspect of the invention, one of the two successive data signals in each of the sets of digital luminance data signals and first and second digital chrominance data signals, respectively, is desirably inverted for obtaining the complement of the inverted data signal and thereby substantially minimizing the low frequency or DC component in each of the transmission channels.

In accordance with a feature of this invention, successive sets of the digital luminance data signals, successive sets of the first digital chrominance data signals and successive sets of the second digital chrominance data signals are distributed into different transmission channels.

In accordance with another feature of this invention, the sets of digital luminance data signals, the sets of first digital chrominance data signals and the sets of second digital chrominance data signals corresponding to pixels of the video picture positioned contiguous to each other in adjacent horizontal lines of the video picture are respectively distributed into different transmission channels.

The above, and other objects, features and advantages of the invention will be apparent in the following detailed description of an illustrative embodiment thereof which is to be read in connection with the accompanying drawings forming a part hereof, and wherein corresponding parts and components are identified by the same reference numerals in the several views of the drawings.

BRIEF DESCRIPTION OF THE DRAWINGS

FIG. 4 is a table to which reference will be made in explaining the operation of a so-called barrel shifter included in the channel encoder of FIG. 3, and which shows the connections established between various inputs and outputs of the barrel shifter in response to various different control data applied to the barrel shifter;

FIG. 5 is a table showing the luminance data signals and chrominance data signals applied to various inputs of the barrel shifter, and to which reference will be made in explaining the operation of the channel encoder;

FIGS. 6A and 6B are tables respectively showing the outputs of the barrel shifter and a subsequent delay circuit for various control data applied to the barrel shifter, and to which reference will be made in explaining the operation of the channel encoder;

FIG. 8 is a table showing how video data at individual sampling points are distributed into eight parallel data;

FIG. 9 is a table showing how the eight parallel data in successive horizontal lines are distributed among eight transmission channels;

FIG. 10 is a table showing the transmission channels receiving the video data corresponding to the sampled points in successive horizontal lines of the video picture;

FIGS. 13A and 13B respectively illustrate the complementary tables of two read only memories (ROMs) included in the circuit of FIG. 12;

FIG. 14A illustrates examples of digital video data applied in succession to one of the data processing circuits in the recording unit of FIG. 1;

FIG. 14B illustrates, by way of example, the results of 8-8 conversion of the digital video data shown on FIG. 14A;

FIG. 14C illustrates the digital video data of FIG. 14A following its 8-8 conversion and selective inverting, that is, the digital video data at the output of the respective data processing circuit;

DETAILED DESCRIPTION OF THE PREFERRED EMBODIMENT

Figure 1:
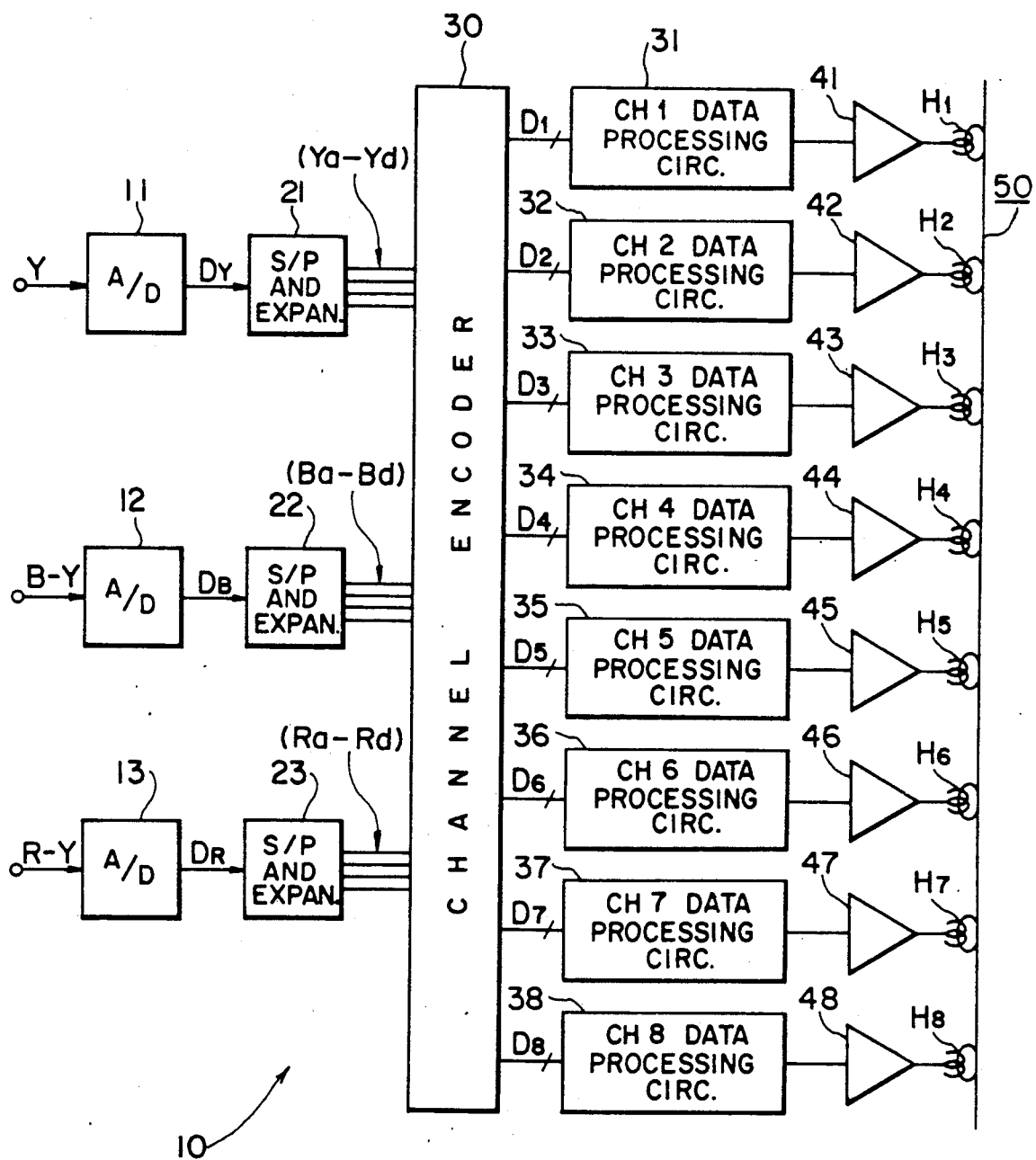
FIG. 1 is a block diagram showing a recording unit in a high-definition type D-VTR in accordance with an embodiment of the present invention.
Figure 2:
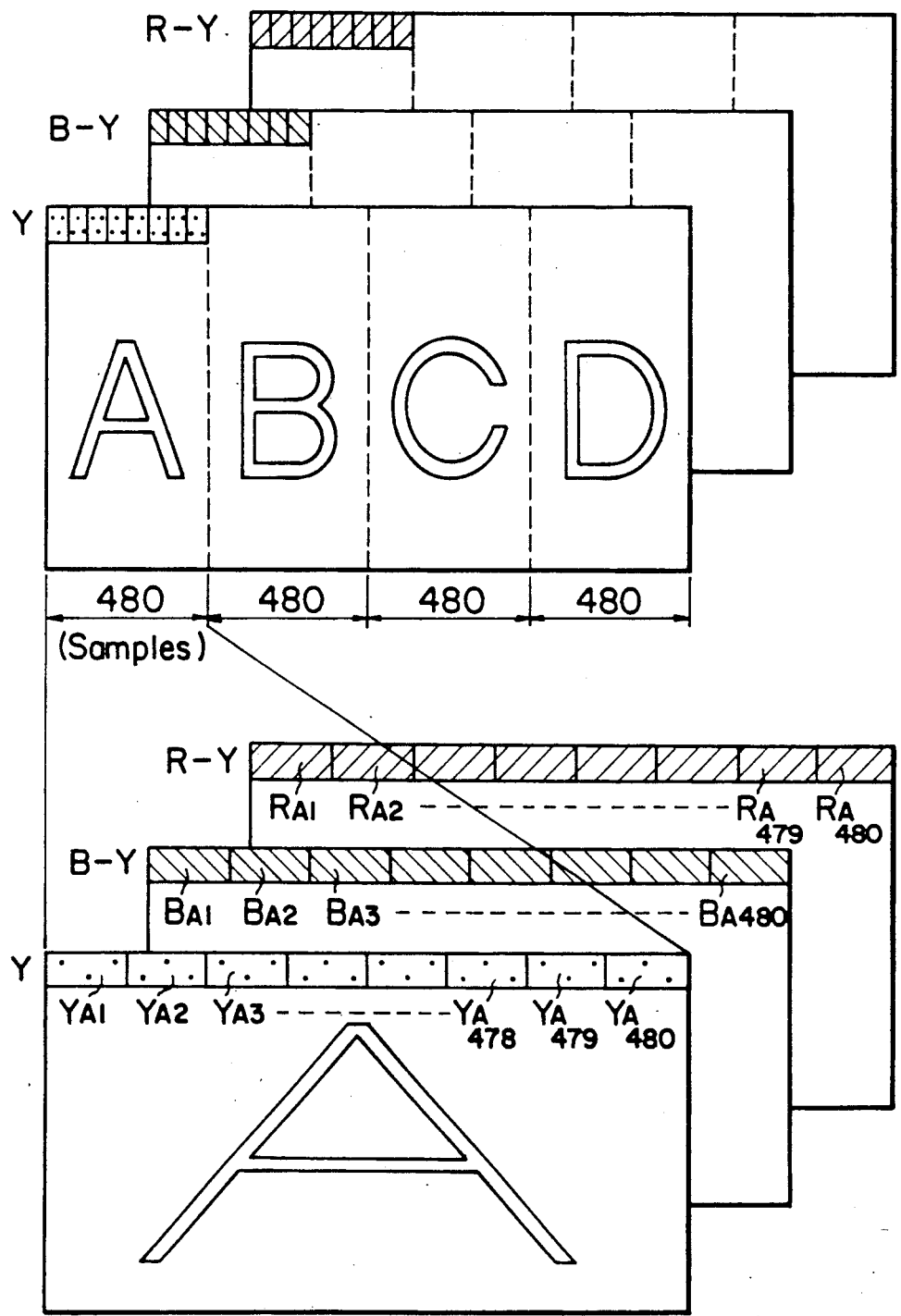
FIG. 2 schematically illustrates how the luminance and chrominance signals constituting one frame of a color video signal are divided in correspondence with horizontally contiguous segments of the respective video picture in the recording unit of FIG. 1.

Referring to the drawings in detail, and initially to FIG. 1 thereof, it will be seen that, in a D-VTR in accordance with an embodiment of the present invention for digitally recording and reproducing video signals of a high-definition television (HDTV) system, the recording unit 10 includes analog-to-digital (A/D) converters 11, 12 and 13 which individually digitize the input luminance signal Y and the input first and second component chrominance signals B-Y and R-Y, respectively, of the HDTV video data signals. The resulting luminance signal data DY and chrominance signal data DB and DR obtained from the A/D converters 11, 12 and 13, respectively, are supplied to serial-to-parallel (S/P) converters 21, 22 and 23, respectively. The S/P converter 21 converts the luminance signal data DY into four parallel digital luminance data signals Ya, Yb, Yc and Yd (FIG. 3) which respectively correspond to four horizontally contiguous frame segments A, B, C and D shown on FIG. 2 to be obtained by dividing a frame of the video picture along vertical lines. Similarly, the S/P converters 22 and 23 convert the digital chrominance data signals DB and DR, respectively, into four parallel digital chrominance data signals Ba, Bb, Bc and Bd, and Ra, Rb, Rc and Rd, respectively, which again respectively correspond to the segments A, B, C and D of a frame of the video picture.

The digital video data signals for each frame of the video picture or image are comprised of 1920 samples per horizontal line of the luminance signal DY, and 1920 samples per horizontal line of each of the chrominance signal data DB and DR. Accordingly, in the case where the video signals constituting a horizontal line are divided into four parallel video data corresponding to the four divided segments A, B, C and D, the luminance signal data DY for each line of a segment are composed of 480 samples and, similarly, the chrominance signal data DB and DR for each line of a divided segment are each composed of 480 samples. Further, in the converters 21, 22 and 23, the four parallel video data Ya-Yd, Ba-Bd and Ra-Rd, respectively, are time-expanded, as indicated on FIG. 2, so that the 480 samples of the luminance signal and of each of the chrominance signals making up each horizontal line of each of the divided segments A, B, C and D will have the same duration as a horizontal line of a full frame of the video picture.

Figure 3:
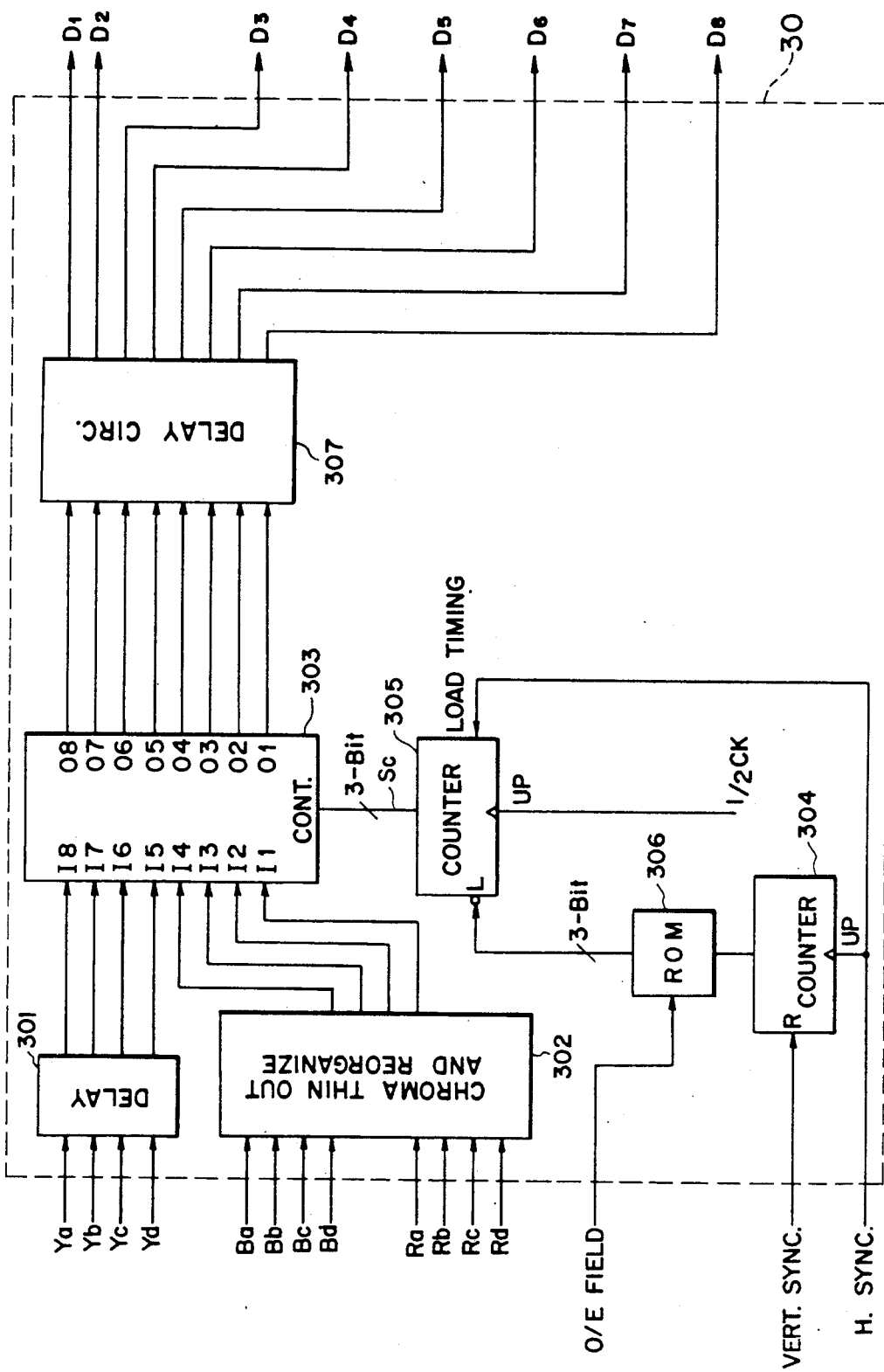
FIG. 3 is a block diagram showing, in greater detail, a channel encoder that is included in the recording unit of FIG. 1.
Figure 7A:
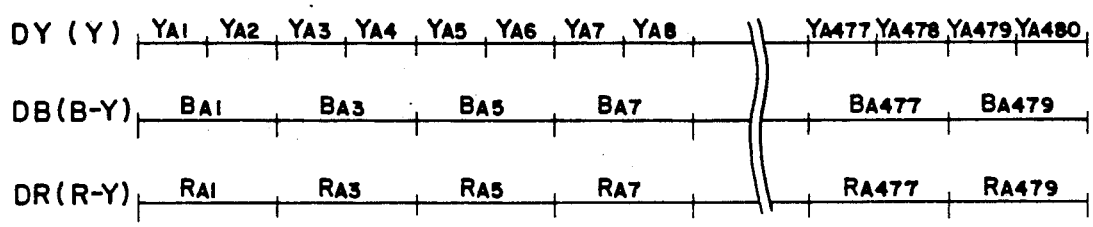
FIGS. 7A, 7B, 7C and 7D diagrammatically show the arrangements of video data in a horizontal line of the four segments, respectively, into which each frame of the video picture is divided in the recording unit of FIG. 1, with the chrominance data having been thinned out.
Figure 7B:
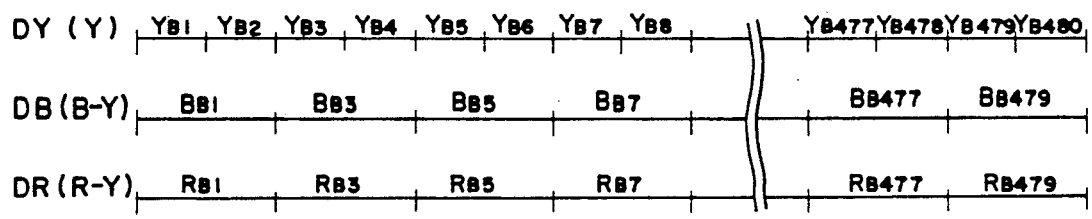
Figure 7C:
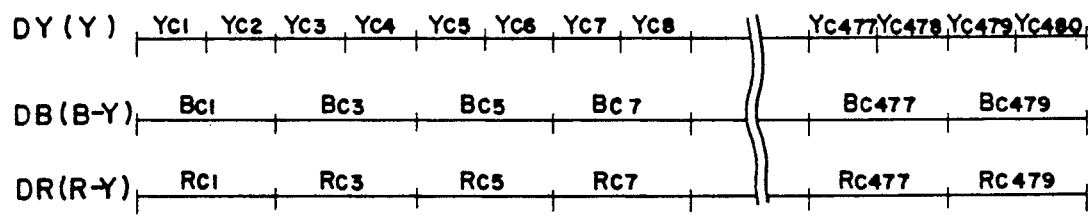
Figure 7D:
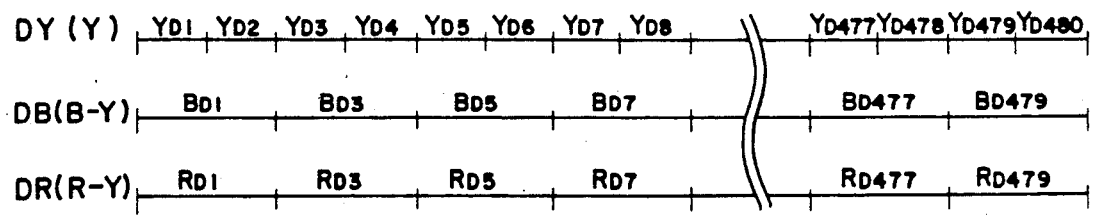

The parallel video data from the S/P converters 21, 22 and 23 are supplied to a channel encoder 30 which, as shown on FIG. 3, includes a delay circuit 301 receiving the parallel data Ya, Yb, Yc and Yd, and a chroma thinning out and reorganizing circuit 302 which receives the parallel data Ba, Bb, Bc and Bd and the parallel data Ra, Rb, Rc and Rd.

As shown on FIGS. 7A-7D, the digital chrominance data signals Ba-Bd and Ra-Rd applied to the circuit 302 are thinned-out in the latter, for example, by sub-sampling or by dropping every other sample of the parallel data, whereupon the thinned-out or remaining samples of the chrominance data Ba-Bd and Ra-Rd are respectively mixed with each other, as shown on FIG. 5, and applied to inputs I5, I6, I7 and I8 of a so-called barrel shifter 303. Simultaneously, the parallel luminance data Ya, Yb, Yc and Yd, after having been delayed for two sampling periods in the delay circuit 301, are respectively applied to inputs I1, I2, I3 and I4 of the barrel shifter 303, as also indicated on FIG. 5.

As shown, the barrel shifter 303 has eight output terminals O1, O2, O3, - - - O8 which are each selectively connectable to each of the inputs I1, I2, I3 - - - I8, for example, through suitable switching circuits (not shown), in response to 3-bit data applied to a control terminal of the barrel shifter 303 and representing a control signal $S_c$ which selectively has a counted value from "0" to "7". As shown on FIG. 4, when the 3-bit control data represents the value "0" of the control signal $S_c$, the output terminals O1, O2, O3, - - - O8 of the barrel shifter 303 are connected to the inputs I1, I2, I3, - - - I8, respectively. Similarly, when the control signal $S_c$ has the value "1", the outputs O1, O2, O3, - - - O8 of the barrel shifter 303 are connected to the inputs I8, I1, I2, - - - I7, respectively.

For providing the 3-bit data constituting the control signal $S_c$ for the barrel shifter 303, the channel encoder 30 is further shown on FIG. 3 to include a counter 304 having a reset input R to which a vertical synchronizing signal separated from the video signal being recorded is applied as a reset pulse. A horizontal line pulse or synchronizing signal, also separated from the video signal being recorded, is supplied to a clock input of the counter 304 so as to be counted up by the latter. The horizontal synchronizing signal is also supplied, as a load timing pulse, to a counter 305 which counts up a clock ½ CK having a frequency which is ½ that of the sampling pulse employed in the A/D converters 11, 12 and 13. The count or output from the counter 305 is the 3-bit data representing the control signal $S_c$. A read only memory (ROM) 306 receives the counted output of the counter 304 and an odd/even field pulse and, in response to each such field-pulse the ROM 306 supplies 3-bit initial data corresponding to the counted value from the counter 304 and which is applied to a load input L of the counter 305. This initial 3-bit data applied as load data to the counter 305 determines which data, among the data DATA 1–DATA 8 (FIG. 8) are supplied from the channel encoder 30 to each of eight transmitting channels CH1, CH2, CH3, - - - CH8, respectively.

Since the counter 305 counts the clock ½ CK having a frequency which is ½ the sampling frequency, it will be apparent that the 3-bit control data supplied as control signal $S_c$ from counter 305 to the barrel shifter 303 changes only every two samples. Accordingly, and as shown on FIG. 6A, the digital luminance data signals Ya–Yd and the first and second digital chrominance data signals Ba–Bd and Ra–Rd of the time-expanded picture segments are divided, by the barrel shifter 303 into respective sets thereof which each consist of two successive data signals. For example, at the output O1 of the barrel shifter 303, as the control signal $S_c$ changes its value every two samples, the resulting output consists of successive sets of digital luminance data signals, as at Ya1, Ya2, and of the first and second digital chrominance data signals, as at Ba1, Ba3 and Rb1, Rb3. As shown on FIG. 3, the outputs O1, O2, O3, - - - O8 of the barrel shifter 303 are connected to a delay circuit 307 in which the outputs O1, O3, O5, O7 are delayed by two sampling periods relative to the outputs O2, O4, O6 and O8 for aligning the heads of the eight parallel streams D1, D2, D3, - - - D8 of video data on FIGS. 1, 3 and 6B.

It will be appreciated from the foregoing that the channel encoder 30 provides eight parallel streams D1, D2, D3, - - - D8 of video data DATA 1, DATA 2, DATA 3, - - - DATA 8 (FIG. 8) of a predetermined data array by rearranging the luminance signal data DY and the chrominance signal data DB and DR received from the A/D converters 11, 12 and 13, respectively, by way of the S/P converters 21, 22 and 23, and then distributes such eight parallel streams D1, D2, D3, - - - D8 of video data DATA 1, DATA 2, DATA 3 - - - DATA 8 into first through eighth channels CH1, CH2, CH3, - - - CH8, respectively, in a predetermined sequence. As shown on FIG. 1, the eight parallel streams of video data DATA 1, DATA 2, DATA 3, - - - DATA 8 thus distributed into the channels CH1, CH2, CH3, - - - CH8 are supplied from data processing circuits 31, 32, 33, - - - 38, respectively, through recording amplifiers 41, 42, 43, - - - 48, respectively, to eight magnetic heads H1, H2, H3, - - - H8, respectively, which are operative to record the received data in 8-channel tracks which desirably extend obliquely on a magnetic tape 50.

In the channel encoder 30, the luminance signal data DY and the chrominance signal data DB and DR converted by the S/P converters 21, 22 and 23 into four parallel streams of data corresponding to the four divided frame segments A, B, C and D are further processed so as to be arranged in sets each comprising two successive samples of the corresponding signal data and arrayed to form the eight parallel streams of data DATA 1, DATA 2, DATA 3, - - - DATA 8, as shown in FIG. 8. It will be seen that, in the arrangement of FIG. 8, each set of two successive samples of the luminance signal data, for example, as indicated at Yb7, Yb8 in DATA 1, is interleaved between sets of two samples of the chrominance signal data DB and DR, for example, as indicated at Ba5, Ba7 and at Rb5, Rb7, respectively. In other words, in each of the eight parallel streams of video data, each set comprised of two samples of the luminance signal data DY is interposed between two sets of the chrominance signal data DB and the chrominance signal data DR, respectively.

As a result of the described operation of the channel encoder 30, the four parallel video data Ya–Yd, Ba–Bd and Ra–Rd provided by the S/P converters 21, 22 and 23 in correspondence to the four divided frame segments A, B, C and D, are rearranged or distributed throughout the eight parallel streams of data DATA 1, DATA 2, DATA 3, - - - DATA 8 which are each composed of sets of two successive samples, as shown on FIG. 8. Furthermore, as shown on FIG. 9, the distribution of the eight parallel streams of data to the individual channels CH1, CH2, CH3, - - - CH8 is changed in a predetermined 8-line sequence so that the data at the same horizontal positions on vertically adjacent horizontal lines of the frame or video picture are distributed to different channels.

Referring now to FIG. 10, which illustrates the channels in which the video data representing the divided frame segment A are distributed, it will be seen that, when the luminance signal data and the chrominance signal data converted into four parallel data corresponding to the divided frame segments A, B, C and D, as described above, are distributed into the several channels CH1–CH8 by the channel encoder 30 in a manner to obtain the data arrangements shown in FIGS. 8 and 9, sets of the digital luminance data signals Ya–Yd, sets of the first digital chrominance data signals Ba–Bd and sets of the second digital chrominance data signals Ra–Rd corresponding to pixels positioned contiguous to each other in adjacent horizontal lines are respectively distributed into different transmission channels. Thus, for example, the data corresponding to the pixels 9 and 10 in line 5 are shown on FIG. 10 to be distributed in channel CH2, whereas the data corresponding to the contiguous pixels 8, 9, 10 and 11 in lines 4 and 6 and the pixels 8 and 11 in line 5 are distributed into the other seven channels, that is, into the channels CH1, and CH3–CH8. By reason of the foregoing, errors occurring in transmission in any channel can be readily corrected and/or concealed on the basis of data transmitted in the other channels.

Figure 12:
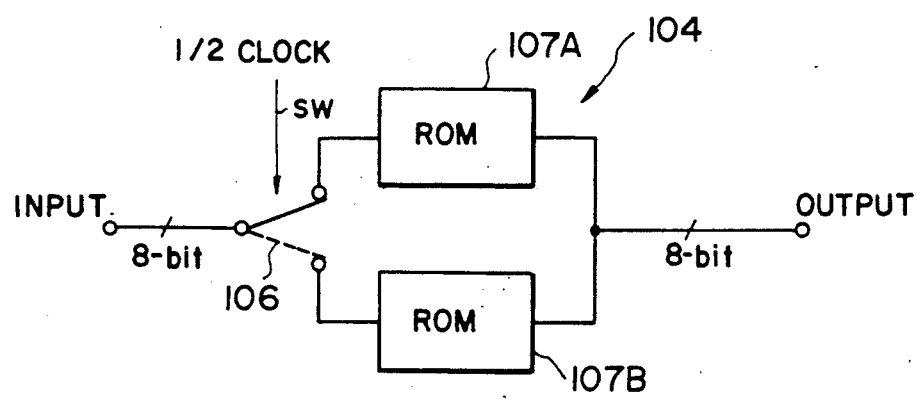
FIG. 12 is a block diagram of a circuit that may be employed for effecting 8-8 conversion and selective inverting of the video data in each of the data processing circuits typified by FIG. 11.

Referring now to FIG. 12 which, by way of example, shows the data processing circuit 31 in the channel CH1, it will be noted that each of the data processing circuits 31, 32, 33 - - - 38 interposed in the channels CH1, CH2, CH3, - - - CH8, respectively, comprises an outer code encoder 101 which receives the video data D1 transmitted through the channel CH1, and which adds thereto, as an error correction code, a first-direction outer code added to each row of 2-dimensional data formed by 2-dimensionally arraying a predetermined number of the video data in the data stream D1 supplied to the respective first channel CH1. A shuffling circuit 102 conventionally shuffles the 2-dimensional data after the addition thereto of the outer code by the encoder 101 and, thereafter, an encoder 103 adds to the 2-dimensional data from the circuit 102, a second-direction inner code acting as an error correction code. Further, the encoder 103 adds a sync word and a block identification code ID. The next component 104 of the data processing circuit 31 is generally operative to effect 8-8 conversion so as to perform a recording-modulation encoding operation in respect to the 2-dimensional data after the addition thereto of the second-direction inner code, the sync word and the block identification code ID by the encoder 103. Further, as will be hereinafter described in detail, the circuit 104 is effective to invert the data for every other sample, that is, to invert one of the two successive data signals in each of the sets of digital luminance data signals and in each of the sets of first and second digital chrominance data signals so as to achieve a desirable code balance within each set of two samples or data signals, even when such code balance is not adequately achieved by means of 8-8 conversion.

More specifically, and as shown on FIG. 12, the circuit 104 may desirably include two ROMs 107A and 107B to which 8-bit video data are selectively input, as address data, through a switch 106 from the output of the encoder 103. As shown on FIGS. 13A and 13B, the ROMs 107A and 107B have complementary tables and, upon being addressed by 8-bit video data, output 8-8 converted video data. The switch 106 is operated by a switch control signal $S_w$ having a frequency equal to $\frac{1}{2}$ the sampling clock frequency so that the switch 106 is in the position shown in full lines to supply the 8-bit input, as an address, to the ROM 107A during the first sample of each set, and to dispose the switch 106 in the position shown in broken lines on FIG. 12 for supplying the 8-bit input as an address to the ROM 107B during the second sample of the same set. The outputs of the ROMs 107A and 107B are connected together for alternately providing the output of the circuit 104.

The operation of the circuit 104 in achieving a desirable code balance within each set of two samples or data signals, even when such code balance is not adequately achieved by means of the 8-8 conversion, will now be described with reference to FIGS. 14A, 14B and 14C. By way of example, FIG. 14A shows the first three sets of DATA 1 supplied to the first channel CH1 during the first line of a frame, and which are shown on FIG. 8 to be comprised of the set of luminance data signals Ya3, Ya4, the set of chrominance data signals Ba5, Ba7, and the set of luminance data signals Yb7, Yb8. For the sake of this explanation, any influence of the outer and inner codes added in the encoders 101 and 103 is disregarded.

The luminance data signals Ya3, Ya4, which are distributed as a set, are assumed to have values represented by the 8-bit digital signals 00100001 and 00100010, respectively, while the chrominance video signals Ba5, Ba7 which are also distributed as a set, are assumed to have values corresponding to the 8-bit digital signals 10000000 and 10000001, and the luminance data signals Yb7, Yb8 are assumed to be represented by the 8-bit digital signals 10101011 and 10100111, respectively, as shown on FIG. 14A.

It is desired that the codes be balanced in each set of 16-bits of digital data so as to equalize the numbers of bits that are "1" and "0". It will be seen that, in the case of the 16-bit digital data representing the set of luminance data signals Ya3, Ya4, the ratio of "1" bits to "0" bits is 4:12, in the case of the 16-bit data representing the chrominance data signals Ba5, Ba7, the ratio of "1" bits to "0" bits is 3:13, and, in the case of the 16-bit data representing the luminance data signals Yb7, Yb8, the ratio of "1" bits to "0" bits is 10:6.

Although the code balance is shown to be improved in respect to the 16-bit data representing the chrominance data signals Ba5, Ba7 as a result of the 8-8 conversion thereof, that is, the 16-bit data obtained by the 8-8 conversion contains 8 "1" bits and 8 "0" bits (FIG. 14B), corresponding improvement in the code balance is not obtained in respect to the 16-bits representing the luminance data signals Ya3, Ya4 and the 16-bit data representing the luminance data signals Yb7, Yb8. Thus, as shown in FIG. 14B, the 16-bits of data representing the data signals Ya3, Ya4 contain 4 "1" bits and 12 "0" bits even after the 8-8 conversion, and the 16-bits of data representing the luminance data signals Yb7, Yb8 contains 10 "1" bits and 6 "0" bits, after the 8-8 conversion, and these ratios are not sufficiently balanced.

However, when the 8-bit data representing the second sample in each of the video data sets are inverted to produce 8-bit data which are complementary to the original data resulting from the 8-8 conversion, a satisfactory code balance is obtained in all instances. Thus, in the example illustrated by FIGS. 14A 14B and 14C, the 8-bit data 10100000 which results from the 8-8 conversion of the 8-bit data representing the luminance data signal Ya4, are inverted to provide the 8-8 bit data 01011111 shown on FIG. 14C. This results in the 16-bit data representing the video data set Ya3, Ya4 containing 8 "1" bits and 8 "0" bits. Similarly, in the case of the video data signals Yb7, Yb8, the 8-bit data 00110111 resulting from the 8-8 conversion of the data representing the signal Yb8 are inverted to provide the 8-bit data 11001000 (FIG. 14C). As a result of the foregoing, the 16-bit data representing the luminance data signals Yb7, Yb8 after the 8-8 conversion and inverting contains 8 "1" bits and 8 "0" bits. Thus, the sets Ya3, Ya4 and Yb7, Yb8 having inadequate code balances even after the 8-8 conversion are provided with precise code balance by the inverting of the 8-bit data representing the second video data signal of each set. Furthermore, where the 8-8 conversion was effective to obtain a proper code balance, as in the case of the set Ba5, Ba7, the inverting of the 8-bit data representing the second sample of that set does not disturb the desirable code balance, as is apparent in FIG. 14C.

Figure 11:
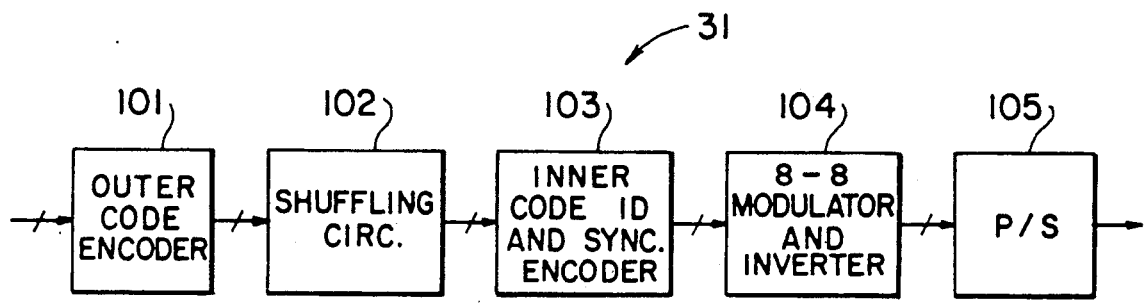
FIG. 11 is a block diagram showing components making up a data processing circuit in each of the transmission channels, of the recording unit of FIG. 1.

Referring again to FIG. 11, it will be seen that the data processing circuit 31 is completed by a parallel-to-series (P/S) converter 105 which receives the recording-modulation encoded data processed by the circuit 104 and sequentially converts each transmission block so as to produce serial data at the output of the respective channel CH1.

Figure 15:
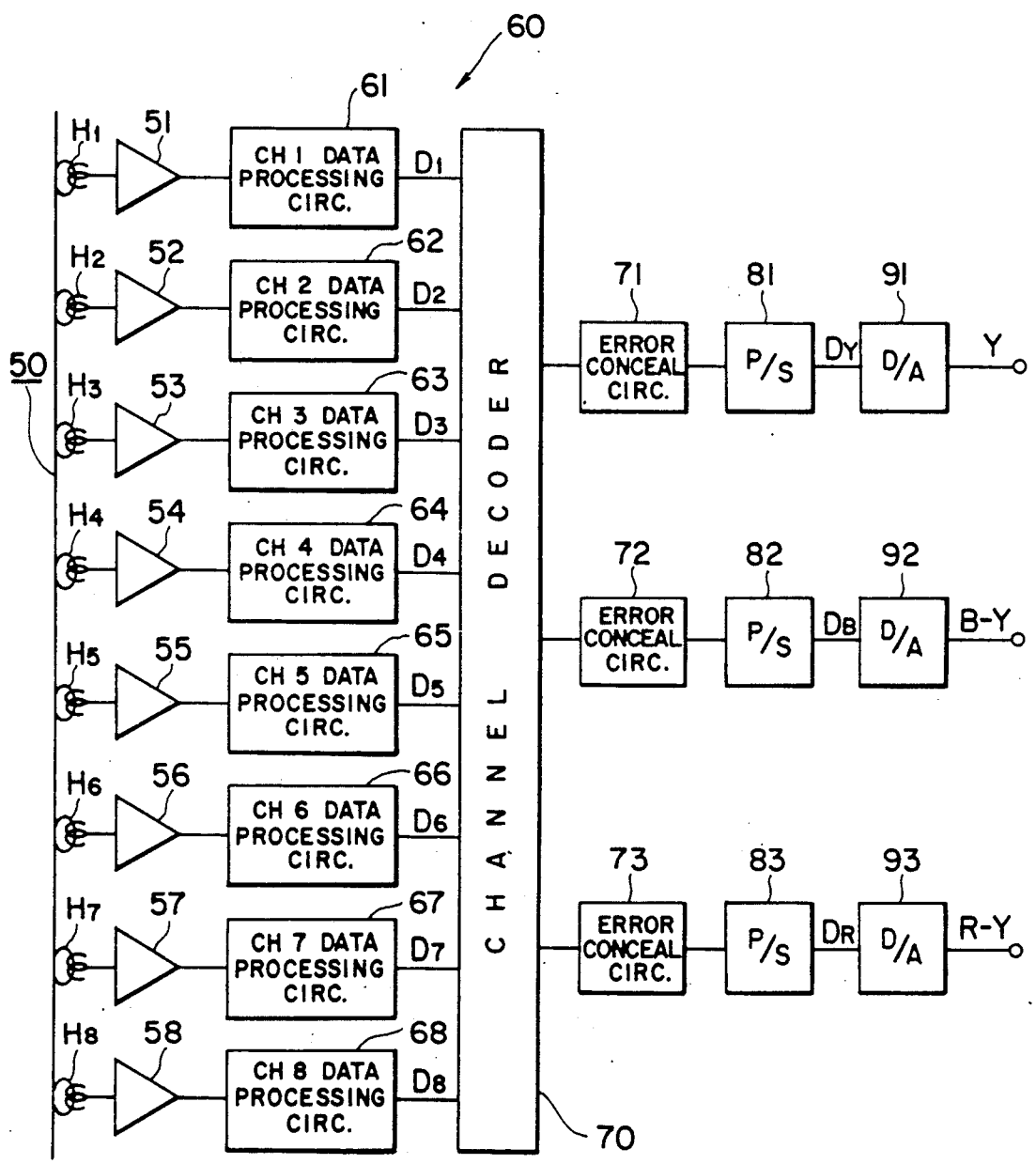
FIG. 15 is a block diagram illustrating a reproducing unit of the D-VTR in which digital video data is transmitted in accordance with an embodiment of the invention.

Referring now to FIG. 15, it will be seen that a reproducing unit 60 of the D-VTR embodying this invention comprises 8 magnetic heads H1, H2, H3, - - - H8 adapted to scan the 8-channel recording tracks on the magnetic tape 50 for reproducing the 8-channel data recorded therein, and for supplying the reproduced data through respective reproducing amplifiers 51, 52, 53, - - - 58 to data processing circuits 61, 62, 63, - - - 68 which are interposed in first through eighth channels CH1, CH2, CH3, - - - CH8, respectively. The data processing circuits 61, 62, 63, - - - 68 are arranged to process the respective data correspondingly to the previously described data processing circuits 31, 32, 33, - - - 38 of the recording unit 10. Thus, the 8-channel video data D1, D2, D3, - - - D8 are obtained from the reproduced data by the data processing circuits 61, 62, 63, - - - 68 and supplied to a channel decoder 70. The channel decoder 70 decodes the 8-channel video data D1, D2, D3 - - - D8 in a manner corresponding to the encoding operation of the channel encoder 30 in the recording unit, and thereby provides the luminance data signal DY and the chrominance data signals DB, DR from the video data D1, D2, D3, - - - D8.

The luminance data signal DY and the chrominance signal data signals DB, DR thus obtained from the channel decoder 70 are processed by error concealing circuits 71, 72 and 73, respectively, and then are supplied through parallel-to-serial (P/S) converters 81, 82 and 83, respectively, to digital-to-analog (D/A) converters 91, 92 and 93. The D/A converters 91, 92 and 93 analogize the luminance data signal DY and the chrominance data signals DB and DR converted previously into serial data by the P/S converters 81, 82 and 83, and thereby provide the reproduced luminance signal Y and component chrominance signals B-Y and R-Y in analog form.

In the reproducing unit 60, the video data D1, D2, D3, - - - D8 obtained by uniformly dispersing the video data of the four divided frame segments A, B, C and D throughout the eight channels CH1, CH2, CH3, - - - CH8 are reproduced so that, even when a fault or increase of the error rate occurs in one or more of the channels, proper error correction and/or concealment can be carried out effectively in respect to the reproduced data, and the harmful influence of such data error on the image quality is dispersed over the entire picture area or frame for ensuring that deterioration of the picture quality as a result of such error is not conspicuous.

Figure 16:
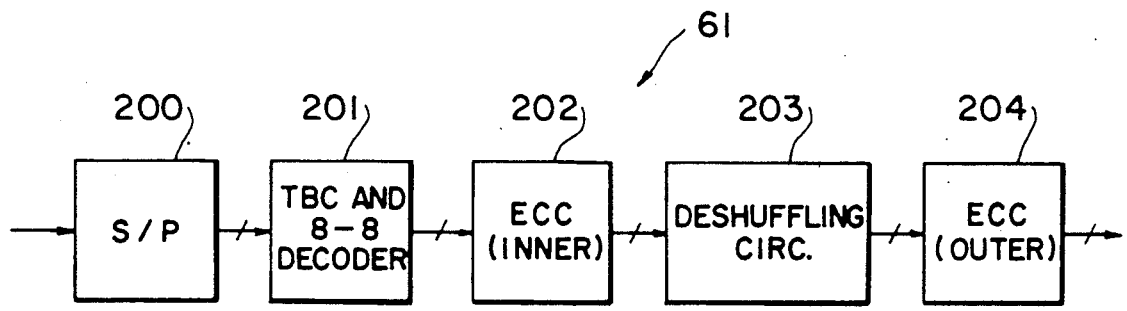
FIG. 16 is a block diagram showing components making up a data processing circuit included in each transmission channel in the reproducing unit of FIG. 15.

Referring now to FIG. 16 which, by way of example, illustrates the data processing circuit 61 acting on the reproduced data in the first channel CH1, it will be seen that each of the data processing circuit 61, 62, 63, - - - 68 comprises a serial-to-parallel (S/P) converter 200 for converting the reproduced data of the respective channel to parallel data. The parallel data from the S/P converter 200 is supplied to a circuit 201 which performs time-base correction thereof and then also performs an 8-8 decoding conversion which corresponds to the 8-8 encoding conversion performed in the circuit 104 of the respective data processing circuit 31 in the recording unit. Thereafter, a circuit 202 performs error correction using the inner error correction code for the reproduced data of the first channel CH1, whereupon a circuit 203 deshuffles the reproduced data in correspondence to the shuffling thereof in the circuit 102 of the data processing circuit 31 of the recording unit. The resulting video data D1 of the first channel CH1 is finally subjected to error correction in a circuit 204 which employs the outer correction code therefor.

The other data processing circuit 62, 63, - - - 68 of the reproducing unit 60 are, as previously noted, similar to the above described data processing circuit 61 and similarly act on the reproduced data in the channels CH2, CH3, - - - CH8, respectively, for providing the video data D2, D3, - - - D8 to the channel decoder 70.

It will be seen that, in the transmission of digital video data signals in accordance with the present invention, for example, in a D-VTR, a luminance signal and first and second chrominance signals, such as, R-Y and B-Y, are individually sampled to provide respective digital luminance data signals DY and first and second digital chrominance data signals DB and DR for forming a high-definition video picture which is spatially divided into four horizontally contiguous segments A, B, C and D which are then each time-expanded four times, whereupon the digital luminance data signals Ya-Yd and the first and second digital chrominance data signals Ba-Bd and Ra-Rd are divided into respective sets thereof which each consist of two successive data signals, and the sets of digital luminance and first and second digital chrominance data signals for each of the segments are distributed into the transmission channels CH1–CH8 in such a manner that each set of digital luminance data signals is interleaved between sets of the first and second digital chrominance data signals, respectively, in each of the transmission channels, as clearly shown on FIGS. 8 and 9. Further, in accordance with this invention, one of the two successive data signals, that is, the second of the data signals forming each of the sets of digital luminance data signals and of first and second digital chrominance data signals, is inverted, as in the circuit 104 of each of the data processing circuits 31–38, for obtaining the complement of the one of the two successive data signals in each set which has been inverted, and thereby substantially minimizing any DC or low-frequency component in each of the transmission channels.

Although a specific embodiment of the invention has been described in detail herein with reference to the accompanying drawings, it is to be understood that the invention is not limited to that precise embodiment and that various changes and modification may be effected therein by one skilled in the art without departing from the scope or spirit of the invention as defined in the appended claims.

What is claimed is:

1. A method of transmitting digital video data signals comprised of digital luminance data signals and first and second digital chrominance data signals, said method comprising the steps of:

dividing said digital luminance data signals into a plurality of sets thereof each consisting of two successive digital luminance data signals;

dividing said first digital chrominance data signals into a plurality of sets thereof, each of said sets of first digital chrominance data signals consisting of two successive first digital chrominance data signals;

dividing said second digital chrominance data signals into a plurality of sets thereof, each of said sets of second digital chrominance data signals consisting of two successive second digital chrominance data signals;

distributing said sets of digital luminance data signals, said sets of first digital chrominance data signals and said sets of second digital chrominance data signals into a plurality of transmission channels in such a manner that each said set of digital luminance data signals is interleaved between a set of said first digital chrominance data signals and a set of said second digital chrominance data signals in each of said transmission channels; and inverting one of said two successive data signals in each of said sets of digital luminance data signals and in each of said sets of first and second digital chrominance data signals for obtaining the complement of said one of the two successive data signals in each set which has been inverted and thereby substantially minimizing any DC component in each of said transmission channels.

2. The method according to claim 1; wherein said distributing effects distribution of successive sets of said digital luminance data signals, successive sets of said first digital chrominance data signals and successive sets of said second digital chrominance data signals into different ones of said transmission channels.

3. The method according to claim 1; wherein said digital video data signals correspond to pixels of a video picture arranged along successive horizontal lines; and wherein sets of said digital luminance data signals, sets of said first digital chrominance data signals and sets of said second digital chrominance data signals corresponding to pixels positioned contiguous to each other in adjacent horizontal lines are respectively distributed into different ones of said transmission channels.

4. A method of transmitting high speed digital video data signals comprised of digital luminance data signals and first and second digital chrominance data signals for forming a high-definition video picture, comprising the steps of:

spatially dividing said high speed digital video data signals corresponding to said high-definition video picture into N horizontally contiguous segments, wherein N is an integer larger than 2;

time-expanding each of said segments of digital video data signals by N times;

dividing said digital luminance data signals of each of said segments into a plurality of sets thereof each consisting of two successive digital luminance data signals;

dividing said first digital chrominance data signals of each of said segments into a plurality of sets thereof, each of said sets of first digital chrominance data signals consisting of two successive first digital chrominance data signals;

dividing said second digital chrominance data signals of each of said segments into a plurality of sets thereof, each of said sets of second digital chrominance data signals consisting of two successive second digital chrominance data signals; and distributing said sets of digital luminance data signals, said sets of first digital chrominance data signals and said sets of second digital chrominance data signals for each of said segments into a plurality of transmission channels in such a manner that each said set of digital luminance data signals is interleaved between a set of said first digital chrominance data signals and a set of said second digital chrominance data signals in each of said transmission channels.

5. The method according to claim 4; further comprising the step of inverting one of said two successive data signals in each of said sets of digital luminance data signals and in each of said sets of first and second digital chrominance data signals for obtaining the complement of said one of the two successive data signals in each set which has been inverted and thereby substantially minimizing any DC component in each of said transmission channels.

6. The method according to claim 4; wherein said distributing effects distribution of successive sets of said digital luminance data signals, successive sets of said first digital chrominance data signals and successive sets of said second digital chrominance data signals into different ones of said transmission channels.

7. The method according to claim 4; wherein said digital video data signals correspond to pixels of a video picture arranged along successive horizontal lines; and wherein sets of said digital luminance data signals, sets of said first digital chrominance data signals and sets of said second digital chrominance data signals corresponding to pixels positioned contiguous to each other in adjacent horizontal lines are respectively distributed into different ones of said transmission channels.

* * * * *